United States Patent Office 2,830,987
Patented Apr. 15, 1958

2,830,987
DERIVATIVES OF PHENTHIAZINE

Paul Gailliot, Paris, Jean Robert, Maisons-Laffitte, and Jacques Gaudechon, Thiais, France, assignors to Societe des Usines Chimiques Rhone-Poulenc, Paris, France, a body corporate of France No Drawing. Application November 21, 1956
Serial No. 623,531

Claims priority, application France July 7, 1952

6 Claims. (Cl. 260—243)

This invention relates to derivatives of phenthiazine and to processes for their production.

This application is a continuation-in-part of applicants' copending application Serial No. 365,272, filed June 30, 1953, now abandoned.

It is known that various 10-aminoalkyl-phenthiazines possess interesting therapeutic properties. Extensive research and experimentation have shown, however, that both the size of the therapeutic index and the nature of the therapeutic effect exhibited by certain compounds of this type can radically be changed by even small changes in chemical structure. Particularly is this the case with variations in the nature and length of the side chain attached to the 10-position nitrogen atom.

It has now unexpectedly been discovered that the hitherto unknown phenthiazine derivatives of the general Formula I:

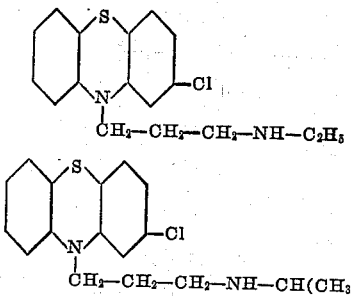

and acid addition salts thereof, wherein A represents a straight or branched aliphatic chain containing 2 or 3 carbon atoms, R represents a saturated or unsaturated alkyl group containing up to 4 carbon atoms, or a lower aralkyl group, and Z and Y are the same or are different and each represents a hydrogen, halogen, methoxy or methyl radical, possess outstanding therapeutic values in human and veterinary medicine, primarily on account of their unusually powerful effect as potentiators of drugs which act upon the nervous system and, more especially, as anti-shock agents. They also possess utility as spasmolytics and anti-histaminics.

The present invention has for its object to provide a group of compounds within the foregoing definition which have quite outstanding properties as potentiators of drugs active on the nervous system, the said compounds being those of the general Formula I wherein Z represents a hydrogen atom, R is an alkyl group containing at most 4 carbon atoms, Y is selected from the class consisting of hydrogen, chlorine, methyl and methoxy groups in the 3-position of the phenthiazine nucleus and A is a —(CH$_2$)$_3$— grouping. Within this group of compounds are the compounds of the formulae:

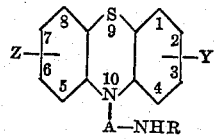

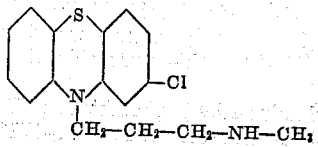

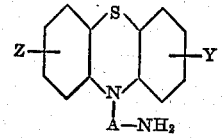

and the said addition salts of the compounds.

The remarkable properties of the said groups of compounds referred to above are illustrated later herein.

The compounds of the present invention may be produced by a variety of methods, including the following:

(a) By condensation of phenthiazine, optionally containing halogen, methoxy or methyl substituents in one or both benzene rings, with a secondary alkylamine of the formula:

$$X—A—NHR$$

where X is a halogen atom. The alkylamine may be used in the form of the free base. The reaction may be carried out with advantage in the presence of a condensing agent, for example, alkali metal or a derivative thereof, for instance the hydride, hydroxide, amide or alcoholate, preferably sodamide or caustic soda.

(b) By alkylation of a phenthiazine derivative of general Formula II

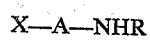

(where A, Z and Y have the meanings ascribed to them above).

The alkylation may be carried out by various methods, e. g.

(i) By the action of an alkyl halide of the formula RX, where X is a halogen atom.

(ii) By forming a Schiff's base by treating the phenthiazine derivative of Formula II with an aldehyde R$_1$CHO, producing an intermediate in which the substituent grouping on the nitrogen of the phenthiazine ring is $$—A—N=CH—R_1$$

and subjecting this Schiff's base to reduction to form the grouping $$—A—NH—CH_2R_1$$

It will be appreciated that since a CH$_2$ group is formed in the reduction, the group R$_1$ must be an alkyl residue containing at most 3 carbon atoms or a phenyl or lower aralkyl group so that the grouping —CH$_2$R$_1$ is equivalent to the grouping R defined above.

(iii) By condensation of the phenthiazine derivative with an aldehyde R$_1$CHO in the presence of formic acid. In this case the value of R$_1$ is as just given, and for the same reasons.

(iv) By forming a Schiff's base as in method (ii), quaternising the said base to form the grouping:

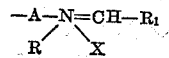

and effecting the fission of this quaternary salt to form the grouping:

and removal of the HX grouping. In this case the value of $R_1$ is not of direct significance since it does not appear in the final product.

(c) By alkylation of a sulphonamide of general Formula III

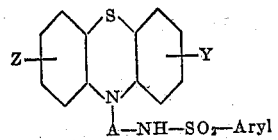

by treatment with an alkyl halide RX and hydrolysing the product.

(d) By treating a halogeno phenthiazine of the general Formula IV

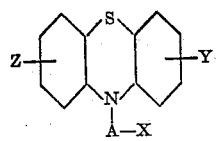

(where A, Z, Y and X have the meanings assigned to them above) with a primary amine of the formula $R.NH_2$.

(e) By reacting a phenthiazine aldehyde of the general Formula V

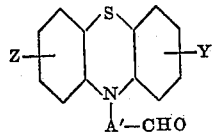

where Z and Y have the meanings assigned to them above, with a primary amine $R.NH_2$ to form a Schiff's base in which the N-substituent grouping is

and subjecting this base to reduction to form the grouping

It will be appreciated that since a $CH_2$ group is formed in the reaction the group A' may contain only 1 or 2 carbon atoms since the grouping —A'—$CH_2$— is equivalent to the grouping A referred to above.

(f) By reducing by any known method, and more particularly by the use of lithium aluminum hydride, an n-carbonamide phenthiazine of general Formula VI, VII, VIII or IX

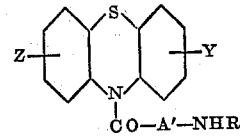

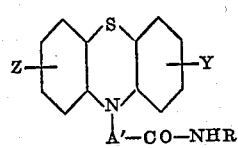

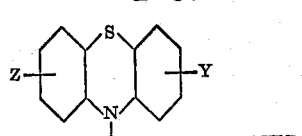

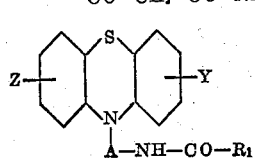

($R_1$ and A' having the meanings assigned to them above).

The following examples illustrate the invention:

EXAMPLE I 120 cc. of a xylene solution of 15 g. of 1-chloro-3-methylaminopropane are gradually added over a period of 1 hour to a boiling suspension of 21.7 g. of 3-chloro phenthiazine and 5.5 g. of sodamide (80%) in 150 cc. of xylene. After the addition is completed heating is continued for 2 hours. After cooling, the product is taken up in dilute aqueous acid and the xylene is separated. The aqueous layer is rendered alkaline to thymolphthalein by the addition of caustic soda (36° Bé.) in order to liberate the base and is extracted with diethyl ether. The ethereal extract is dried over sodium sulphate, the ether is driven off on a water bath and the product is rectified. 8 g. of 3-chloro 10-(3'-methylamino-propyl) phenthiazine (B. $P._{0.4}$=200°–207° C.), the hydrochloride of which melts at 185°–186° C., are thus obtained.

EXAMPLE II

A solution of 3.11 g. of benzaldehyde in 40 cc. of ethyl alcohol is added to a solution of 7.1 g. of 10-(2'-amino-ethyl) phenthiazine in 40 cc. of ethyl alcohol. The mixture is heated at boiling point for one hour over a water bath, and then cooled to room temperature. The solution obtained is introduced into an autoclave with 5 g. of Raney nickel in suspension in 25 cc. of ethyl alcohol, and then hydrogenated under a pressure of 80 kg. at about 60° C. for 8 hours. The nickel is filtered off and the ethyl alcohol evaporated in vacuo. 8.7 g. of 10-(2'-menzylamino-ethyl) phenthiazine, the maleate of which melts at 204°–205° C., are thus obtained.

EXAMPLE III 26.5 g. of 3-chloro 10-(3'-chloro-propyl) phenthiazine and 50 g. of anhydrous isopropylamine are introduced into an autoclave. The autoclave is closed and the mixture is heated for 24 hours at 80° C. and then for 48 hours at 100° C. The autoclave is cooled and opened, excess isopropylamine is evaporated off and the residue is taken up in 200 cc. of diethyl ether and 100 cc. of water. The aqueous layer is separated and the ethereal layer is taken up in 500 cc. of water and acidified by the addition of 30 cc. of hydrochloric acid (approximately 5 N). The mixture is agitated, and the hydrochloride which separates is filtered off and washed with water and with diethyl ether. A second hydrochloride fraction is recovered from the mother liquors. The two fractions are combined and suspended in 500 cc. of water. The mixture is made alkaline by addition of 50 cc. of caustic soda (36° Bé.) and then extracted with three lots of 150 cc. of diethyl ether. The ethereal extracts are dried over sodium sulphate, the ether is evaporated by heating on a water bath and the residue is rectified. 15.25 g. of 3-chloro 10-(3'-isopropylamino-propyl) phenthiazine, which boils at 203°–207° C. under 0.4 mm., are thus obtained. The hydrochloride (12.65 g.) is prepared by the action of ethereal hydrogen chloride on a solution of the base in diethyl ether, and melts at 219°–220° C.

The following products are prepared by the same procedure:

3 - chloro 10 - (3' - methylamino - propyl) phenthiazine, B. $P._{0.4}$=200–207° C.—hydrochloride M. P.=185–186° C.

3 - methyl 10 - (3' - methylamino - propyl) phenthiazine, B. $P._{0.4}$=193–197° C.—hydrochloride M. P.=167–168° C.

3-chloro 10-(3'-ethylamino-propyl) phenthiazine, B. $P._{0.45}$=208–214° C.—hydrochloride M. P.=154–156° C.

3-methyl 10-(3' - isopropylamino - propyl) phenthiazine, B. $P._{0.25}$=177–184° C.'—hydrochloride M. P.=214–215° C.

10-(2'-methylamino-ethyl) phenthiazine, B. $P._{0.6}$=180–185° C.—hydrochloride M. P.=171–172° C.

10-(2'-ethylamino-ethyl) phenthiazine, B. P.$_{0.4}$=198–199° C.

3-methyl 10-(3'-ethylamino-propyl) phenthiazine, B. P.$_{0.25}$=196–198° C.—hydrochloride M. P.=199–200° C.

2-methoxy 10-(3'-isopropylamino-propyl) phenthiazine, B. P.$_{0.35}$=208–215° C.—hydrochloride M. P.=179.5–180.5° C.

EXAMPLE IV

Into 15 cc. of a solution in diethyl ether (2.5%) of lithium-aluminum hydride is introduced a solution of 2.7 g. of 10-(2'-formamidoethyl) phenthiazine (M. P. 153–154° C.; obtained by the formylation of 10-(2'-amino-ethyl) phenthiazine) in 40 cc. of tetrahydrofuran. The mixture is allowed to stand for a quarter of an hour and then heated under reflux on a water bath for ten hours.

The product is allowed to cool and is taken up in 50 cc. of water. The aqueous layer is separated and the organic layer is extracted with two lots of 15 cc. of a 10% aqueous solution of methane sulphonic acid. The acid aqueous solution is washed with 20 cc. of diethyl ether, and caustic soda (36° Bé.) is added until it is alkaline to thymolphthalein. The base which separates is then twice extracted with 20 cc. of ether. The ethereal extract is dried over sodium sulphate, the ether is driven off and the residue is rectified. 1.4 g. of 10-(2'methylamino-ethyl) phenthiazine (B. P.$_{0.6}$=180–185° C.), the hydrochloride of which melts at 171–172° C., is thus obtained.

EXAMPLE V 0.7 g. of (phenthiazinyl-10) acetylmethylamine M. P. 228° C. is suspended in 10 cc. of anhydrous diethyl ether and hydrogenated by adding over a period of 5 minutes 10 cc. of a 2% solution in diethyl ether of lithium aluminum hydride. The mixture is stirred for 2 hours at 20° C. and then heated for 1 hour under reflux. There is then added 2 cc. of water followed by 5 cc. of caustic soda (density 1.33). The solution is filtered and washed with diethyl ether. The ether solution is stirred with 2 cc. of normal hydrochloric acid and the aqueous layer is decanted. The hydrochloride of 10-(2'-methylamino-ethyl) phenthiazine crystallises out. It melts at 171–172° C.

The ether solution is stirred with an aqueous solution of methane sulphonic acid. The aqueous acid layer is treated with caustic soda and the free base is extracted with diethyl ether. On addition of diethyl ether saturated with hydrochloric acid gas there is obtained a further yield of the hydrochloride of 10-(2'-methylamino-ethyl) phenthiazine M. P. 171–172° C.

EXAMPLE VI 0.32 g. of 3-(3'-chlorophenthiazinyl-10') propionylmethylamine M. P. 85° C. is hydrogenated in a medium of 5 cc. of anhydrous diethyl ether by the addition of 10 cc. of a 2% solution of lithium aluminum hydride. The mixture is stirred for 2 hours at 20° C. and then heated for 1 hour under reflux. 1 cc. of water is added and the mixture is filtered and washed with ether. The ether solution is stirred with 2 cc. of normal hydrochloric acid. The aqueous acid solution thus obtained is treated with caustic soda and the liberated base extracted with ether. There is then added ether saturated with hydrochloric acid gas to yield the hydrochloride of 3-chloro-10-(3'-methylamino-propyl) phenthiazine which after recrystallisation from dioxane and then from a mixture of methyl alcohol and anhydrous diethyl ether, melts at 185° C.

EXAMPLE VII

A solution containing 6.3 g. of 10-(2'-amino-ethyl) phenthiazine and 1.1 g. of allyl chloride in 40 cc. of ethyl alcohol is heated at 100° C. for 48 hours in an autoclave. The autoclave is cooled, opened and the alcohol removed by evaporation in vacuo. The residue is taken up in 200 cc. of diethyl ether. The solution is filtered and the residue washed with 50 cc. of diethyl ether. The filtrates are combined and the ether removed in vacuo. There is thus obtained 2.5 g. of 10-(2'-allylamino-ethyl)-phenthiazine. The corresponding oxalate after recrystallisation from 50% aqueous isopropyl alcohol melts at 251 to 252° C.

As stated above the compounds of the narrow class with which the invention is concerned have quite outstanding properties as potentiators of drugs active on the nervous system. This may be conveniently illustrated by comparison with phenthiazine compounds of close chemical constitution already known in the art and such comparative tests are set out below:

The following compounds are referred to in the test results given:

(a) *Compounds of the present invention*

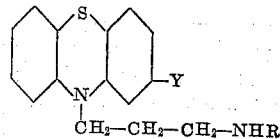

| Compound | Y | R |
|---|---|---|
| A | Cl | CH$_3$ |
| B | CH$_3$ | CH$_3$ |
| C | Cl | C$_2$H$_5$ |
| D | CH$_3$ | C$_2$H$_5$ |
| E | Cl | C$_3$H$_7$ (iso) |
| F | CH$_3$ | C$_3$H$_7$ (iso) |

(b) *Compounds of prior art*

| Compound | Q | X |
|---|---|---|
| G | S | —CH$_2$—CH(CH$_3$)—N(CH$_3$)$_2$ |
| H | S | —CH$_2$—CH$_2$—N⟨ (pyrrolidinyl) |
| I | S | —CH$_2$—CH$_2$—N(CH$_3$)$_2$ |
| J | S | —CH$_2$—CH$_2$—NH—CH(cyclohexyl) |
| K | SO | —CH$_2$—CH$_2$—NH—C$_2$H$_5$ |
| L | S | —CH$_2$—CH$_2$—NH—C$_4$H$_9$ |

The tests applied were as follows:

(i) *Potentiation of hexobarbitone*

The product to be studied is administered subcutaneously to the mouse in dose of 20 mg./kg. 30 minutes later, hexobarbitone is administered intravenously, a dose of 50 mg./kg. The mean duration in minutes of narcosis is noted.

The following results were obtained:

| Compound: | Time |
|---|---|
| A | 133 |
| B | 100 |
| C | 120 |
| D | 98 |
| E | 56 |
| F | 114 |
| G | 30 |
| H | 23 |
| I | 30 |
| J | 29 |
| K | 32 |
| L | 30 |

(ii) Potentation of analgesics (morphine)

The method of Hesse [Arch. exp. Pathol. Pharmacol., 158, 233 (1930)] is employed on the mouse. The substance to be studied is administered subcutaneously in a dose of 10 mg./kg. 30 minutes later, morphine is administered subcutaneously in a dose of 5 mg./kg. The percentage analgesia obtained in 3 hours is noted.

The following results were obtained:

| Compound: | Time |
|---|---|
| A | 52 |
| B | 46 |
| C | 62 |
| G | 23 |
| H | 3 |
| I | 3 |
| J | 9 |
| K | 0 |
| L | 0 |

The foregoing results show the clear and unexpected advantage of the compounds of the invention (A to F inclusive) over the compounds previously described (G to L).

We claim:

1. A compound selected from the class consisting of compounds of the general formula:

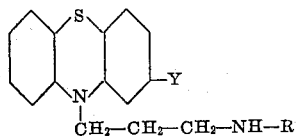

where R is an alkyl group containing at most 4 carbon atoms and Y is selected from the class consisting of hydrogen, chlorine, methyl and methoxy groups and the hydrochlorides, maleates and oxalates thereof.

2. The compound of the formula:

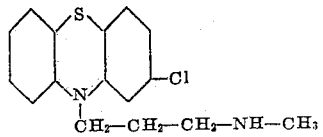

3. The compound of the formula:

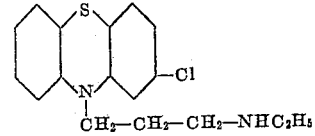

4. The compound of the formula:

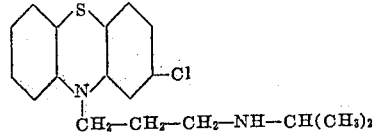

5. The hydrochloride of the compound of the formula:

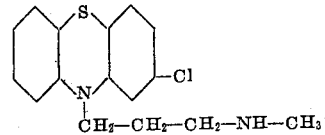

6. The hydrochloride of the compound of the formula:

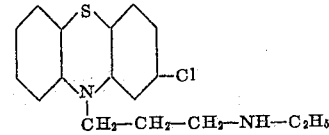

References Cited in the file of this patent
FOREIGN PATENTS
1,060,189    France _____ Nov. 18, 1953